United States Patent
Lolli et al.

(10) Patent No.: US 6,689,004 B2
(45) Date of Patent: Feb. 10, 2004

(54) CONTINUOUSLY-VARIABLE-RATIO TRANSMISSION BELT

(75) Inventors: Sergio Lolli, Ascoli Piceno (IT); Luigi Celio, Talena (IT)

(73) Assignee: Dayco Europe S.r.l. (IT)

( * ) Notice: Subject to any disclaimer, the term of this patent is extended or adjusted under 35 U.S.C. 154(b) by 312 days.

(21) Appl. No.: 09/732,567

(22) Filed: Dec. 8, 2000

(65) Prior Publication Data
US 2001/0014636 A1 Aug. 16, 2001

(30) Foreign Application Priority Data
Dec. 10, 1999 (IT) ........................... TO66A1085

(51) Int. Cl.$^7$ .............................. F16G 5/16; B29D 11/06
(52) U.S. Cl. ........................ 474/242; 474/201; 474/248; 156/138
(58) Field of Search ................................ 474/201, 242, 474/245, 237, 261, 260, 265, 244, 238, 243, 240, 264; 264/251, 277; 305/182, 183, 184, 40; 156/138, 140, 142

(56) References Cited

U.S. PATENT DOCUMENTS

| | | | | |
|---|---|---|---|---|
| 2,874,583 A | * | 2/1959 | Platt | 474/150 |
| 3,049,460 A | * | 8/1962 | Adams | 156/140 |
| 3,673,883 A | * | 7/1972 | Adams | 156/138 |
| 3,738,188 A | * | 6/1973 | Ray | 156/138 |
| 3,808,901 A | * | 5/1974 | Berg | 474/242 |
| 4,734,085 A | * | 3/1988 | Takashima et al. | 474/201 |
| 5,020,865 A | * | 6/1991 | Edwards et al. | 305/182 |
| 6,102,823 A | * | 8/2000 | Hosokawa et al. | 474/242 |

FOREIGN PATENT DOCUMENTS

| | | | |
|---|---|---|---|
| JP | 61-286638 | * | 12/1986 |
| JP | 4 224341 | * | 8/1992 |
| JP | 11-108125 | * | 4/1999 |

* cited by examiner

Primary Examiner—Marcus Charles
(74) Attorney, Agent, or Firm—Synnestvedt, Lechner & Woodbridge; Richard C. Woodbridge; Stuart H. Nissim, Esq

(57) ABSTRACT

A continuously-variable-ratio transmission belt includes a beltlike continuity element having a body made of elastomeric material and in turn having inner teeth and outer teeth and a number of threadlike longitudinal inserts embedded inside the body; and a number of separate friction blocks which are made of plastic material, are co-molded onto the continuity element so as to each incorporate one tooth of the inner teeth and one tooth of the outer teeth, and are each defined by two lateral surfaces converging inwards of the belt and cooperating with respective sides of a groove of a trapezoidal-grooved pulley.

3 Claims, 2 Drawing Sheets

CONTINUOUSLY-VARIABLE-RATIO TRANSMISSION BELT

FIELD OF THE INVENTION

The present invention relates to a continuously-variable-ratio transmission belt.

BACKGROUND OF THE INVENTION

As is known, continuously-variable-ratio transmissions (CVT) or variable-speed drives employ substantially trapezoidal-section belts, the lateral friction surfaces of which cooperate with respective sides of trapezoidal-grooved pulleys; and the velocity ratio is varied by known mechanisms altering the width of the pulley grooves and hence the winding diameter of the belt.

Low-power transmissions currently employ belts having a body made of elastomeric material and having threadlike longitudinal reinforcing elements for achieving the required tensile strength. The body of elastomeric material normally has inner and outer notches to make the belt fairly flexible and enable the belt to operate with small winding diameters while maintaining a sufficiently extensive lateral surface.

Higher-power transmissions employ belts having transverse stiffening elements, which are superimposed on respective teeth of the inner and outer notches to prevent transverse buckling of the belt. The stiffening elements superimposed on each pair of opposite inner and outer teeth may be connected by a connecting element through the body of the belt.

Belts of the above type, in which power is transmitted by direct contact between the elastomeric material of the body and the pulleys, are unsuitable for high-power transmissions, such as those used in automobile variable-speed drives.

These normally employ metal belts, which, however, besides being relatively expensive and heavy, are exclusively oil-bath operated and therefore of limited application.

In an attempt to overcome the limitations of metal belts, dry transmission belts have been proposed comprising a continuity element in the form of an endless belt with an elastomeric body and a number of substantially inextensible longitudinal inserts; and a number of separate friction elements or blocks made of plastic material, carried by the continuity element, and defining the lateral friction surfaces cooperating with the pulleys. The friction blocks are normally fitted to the longitudinal continuity element by means of auxiliary connecting elements or by force-fitting the blocks onto the continuity element. Belts of the type briefly described above are complex and expensive, and involve a good deal of painstaking assembly work.

SUMMARY OF THE INVENTION

It is an object of the present invention to provide a high-power CVT belt suitable, for example, for automobile variable-speed drives, and which provides for eliminating the aforementioned drawbacks typically associated with known belts.

According to the present invention, there is provided a continuously-variable-ratio transmission belt comprising a beltlike continuity element having a body of elastomeric material and a number of threadlike longitudinal inserts; and a number of separate friction blocks made of plastic material, fixed to said continuity element, and each defined by two lateral surfaces converging inwards of said belt and cooperating with respective sides of a groove of a trapezoidal-grooved pulley; characterized in that said continuity element comprises inner teeth defined by a number of first teeth alternating with respective cavities, and outer teeth defined by a number of second teeth alternating with respective cavities; and in that each of said friction blocks incorporates at least one of said first teeth and at least one of said second teeth.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
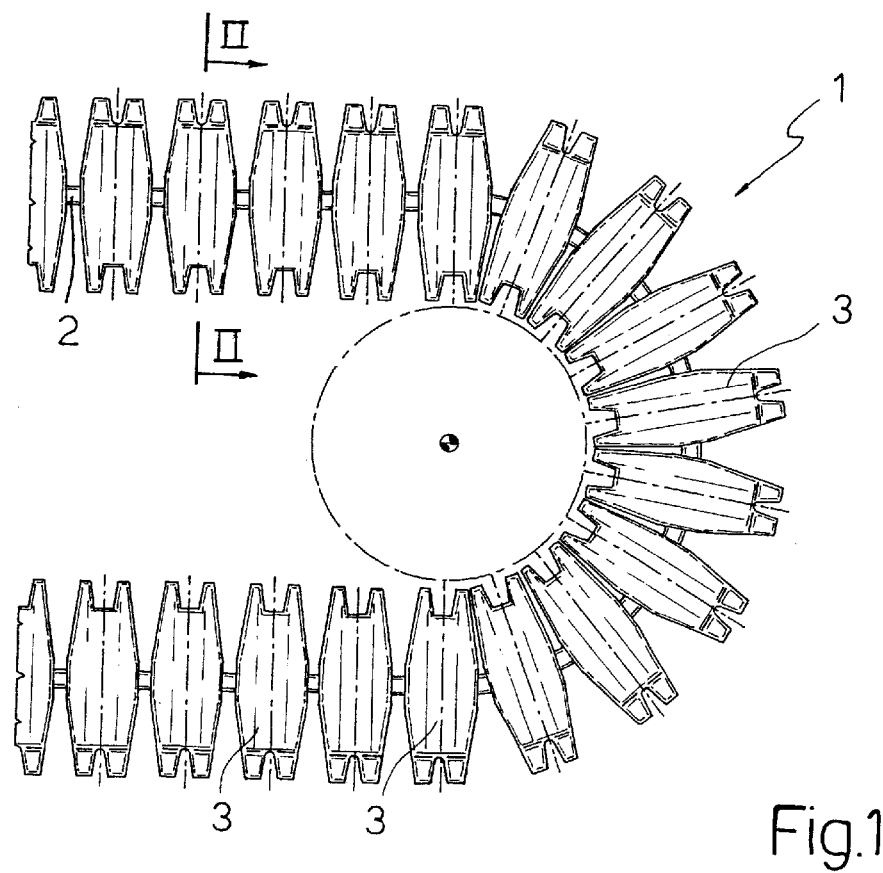
FIG. 1 shows a side view of part of a belt in accordance with the present invention.

Number 1 in the accompanying drawings indicates as a whole a belt for a continuously-variable-ratio transmission (CVT).

Belt 1 substantially comprises an endless, annular, beltlike, load-transmitting continuity element 2; and a number of friction blocks 3 spaced apart and secured to continuity element 2, and the respective sides 4 of which cooperate frictionally with known trapezoidal-grooved transmission pulleys (not shown).

More specifically, continuity element 2 substantially comprises a body 5 made of elastomeric material, e.g. HNBR, having inner teeth 6 and outer teeth 7; and a number of threadlike, substantially inextensible inserts 8 embedded in body 5 and extending longitudinally and parallel to one another along the body. Inserts 8 are formed using a conventional spiraling technique, and may be defined by glass or aramidic fibers, e.g. of the type known commercially as Kevlar®.

Figure 3:
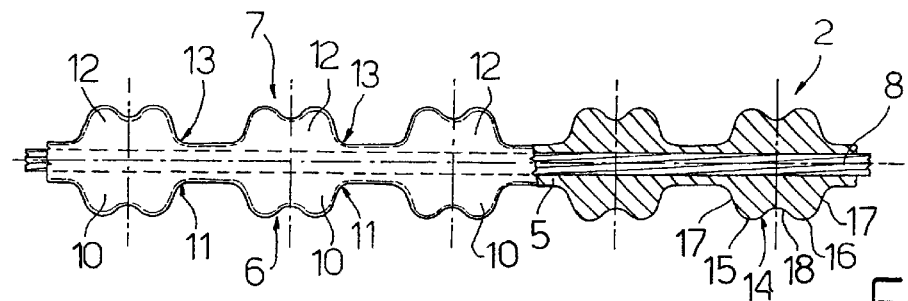
FIG. 3 shows a partially sectioned side view of part of a continuity element of the FIG. 1 belt.

Inner teeth 6 comprise a number of teeth 10 alternating with cavities 11; outer teeth 7 comprise a number of teeth 12 alternating with cavities 13; and teeth 10 and cavities 11 of inner teeth 6 are identical with and located opposite respective teeth 12 and cavities 13 of outer teeth 7. Teeth 10 and 12 of respective teeth 6, 7 (FIG. 3) conveniently comprise top surfaces 14 having a curved profile defined by two convex lateral portions 15, 16, each connected to a respective side 17 of the tooth, and by a concave intermediate portion 18 connected to respective lateral portions 15, 16.

Figure 2:
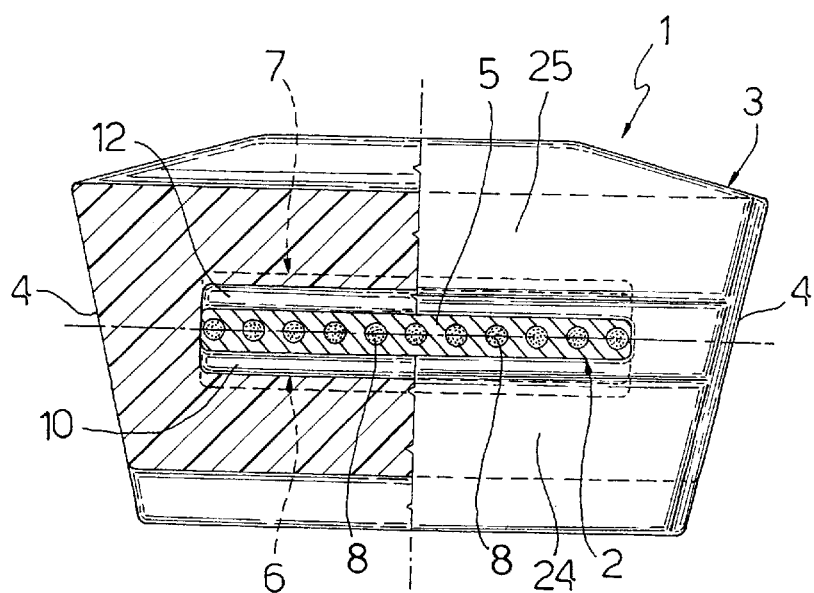
FIG. 2 shows a larger-scale section along line II—II in FIG. 1.
Figure 4:
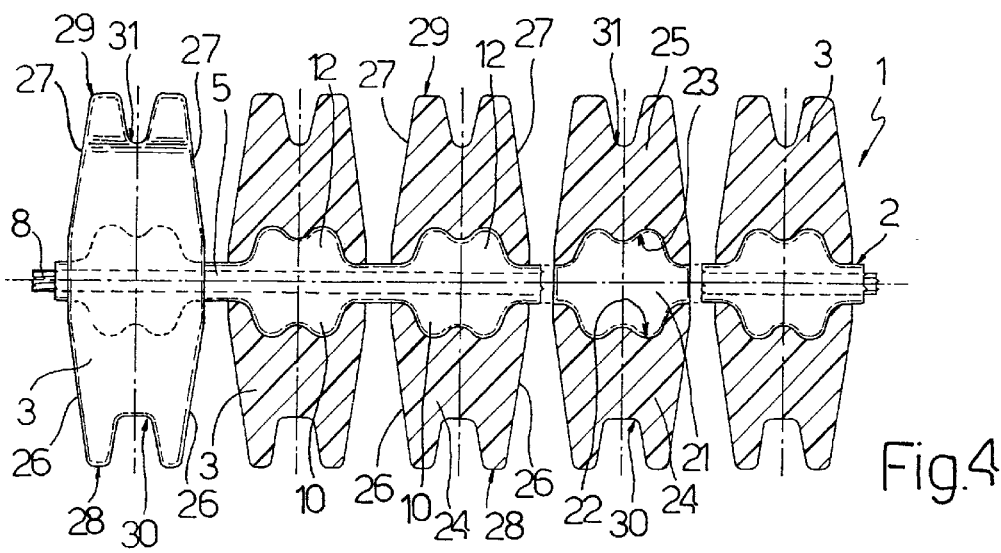
FIG. 4 shows a larger-scale, partially sectioned side view of part of the FIG. 1 belt.

Friction blocks 3 are made of plastic material and, according to the present invention, are co-molded onto body 5 so as to surround it completely and each incorporate a tooth 10 and a corresponding tooth 12. Each block 3 is substantially trapezoidal (FIG. 2) and comprises a central through cavity 21 engaged by and complementary in shape to continuity element 2 (FIG. 4). More specifically, cavity 21 of each block 3 comprises, on the side facing inwards of belt 1, a recess 22 negatively reproducing the shape of a corresponding tooth 10 of continuity element 2, and, on the side facing outwards of belt 1, a recess 23 negatively reproducing the shape of a corresponding tooth 12 of continuity element 2.

Figure 5:
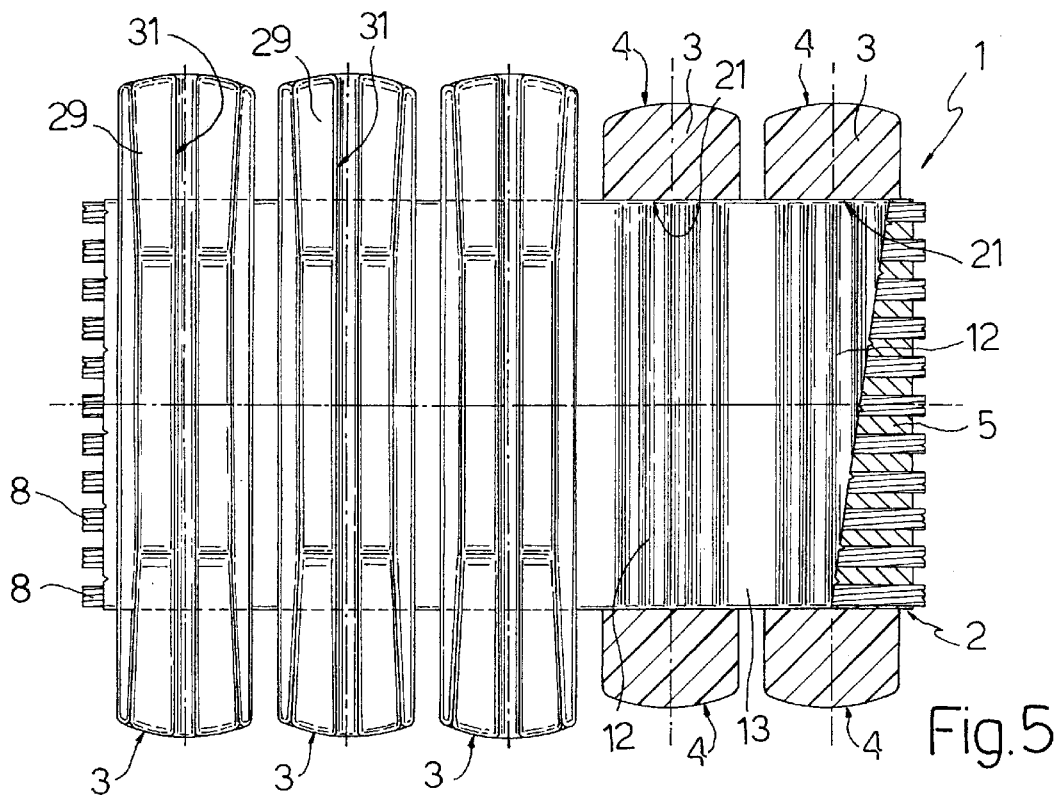
FIG. 5 shows a partially sectioned front view of part of the FIG. 1 belt.

The sides 4 of each block 3 are conveniently defined by respective longitudinally convex surfaces (FIG. 5) converging inwards of belt 1, and the convex shape of which assists self-alignment of blocks 3 when engaging the pulleys. Each block 3 (FIG. 4) comprises an inner portion 24, i.e. extending inwards of belt 1 from body 5; and an outer portion 25 extending outwards of belt 1 from body 5. Inner portion 24 is defined longitudinally by two surfaces 26 converging inwards of belt 1, and is therefore tapered in longitudinal section to permit small winding diameters of belt 1 (FIG. 1) with no interference between adjacent blocks 3. Outer portion 25 of each block 3 is also conveniently tapered, i.e. defined longitudinally by two surfaces 27 converging outwards of belt 1, to assist removal of blocks 3 from the mold. Blocks 3 are also defined inwards and outwards of belt 1 by respective surfaces 28, 29 in which are formed respective transverse recesses 30, 31, so that inner and outer portions 24 and 25 have a substantially H-shaped longitudinal section (FIG. 4) with small variations in the thickness of the walls to assist homogeneous distribution of the plastic material during molding.

The method of fabricating belt 1 substantially comprises a first step wherein continuity element 2 is formed using known toothed belt fabrication techniques; a second step wherein continuity element 2 is placed inside a mold (not shown) having a number of cavities of the same shape and number as blocks 3 of belt 1, so that each cavity houses a pair of opposite teeth 10, 12; and a third co-molding step wherein the plastic material is injected into the mold cavities.

According to the present invention, belt 1 is therefore extremely easy and cheap to produce, with no painstaking operations involving the formation, handling and assembly of a large number of components.

The plastic material from which blocks 3 are made may be thermoplastic or heat-setting, and may or may not adhere to the elastomeric material of body 5 of continuity element 2. In fact, by virtue of the complementary fit of blocks 3 and continuity element 2, load is transmitted substantially by mechanical meshing as opposed to adhesion, i.e. by chemical bonding of the materials. As such, the best materials can be selected on the basis of mechanical stress, with substantially no limitations posed by the plastic material of blocks 3 having to adhere to the elastomeric material of body 5.

Clearly, changes may be made to belt 1 as described herein without, however, departing from the scope of the accompanying claims. In particular, blocks 3 may have a composite structure, e.g. comprising inserts or surface layers of different material, to achieve optimum mechanical strength and friction resistance.

What is claimed is:

1. A continuously-variable-ratio transmission belt (1) comprising an endless belt element (2) having a body (5) of elastomeric material and a number of longitudinal cord inserts (8); and a number of separate friction blocks (3) made of plastic material, fixed to said endless belt element (2), and each friction block defined by two lateral surfaces (4) converging inwards of said belt (1); characterized in that said endless belt element (2) comprises inner teeth (6) defined by a number of first teeth (10) alternating with respective cavities (11), and outer teeth (7) defined by a number of second teeth (12) alternating with respective cavities (13); and in that each of said friction blocks (3) incorporates at least one of said first teeth (10) and at least one of said second teeth (12)

wherein said friction blocks (3) are molded onto said endless belt element (2) and each of said friction blocks (3) is formed in one piece completely surrounding said endless belt element (2) and having a central through cavity (21) engaged by said endless belt element (2) and having recesses (22, 23) cooperating with and complementary in shape to the respective said first and said second teeth (10, 12).

2. A method of producing the continuously-variable-ratio transmission belt of claim 1, said method comprising a first step of forming said continuity element (2); a second step of placing said continuity element (2) inside a mold having a number of separate cavities of the same shape as the friction blocks (3) of the belt (1) and equal in number to the number of said blocks (3) so that each cavity of the mold houses at least one of said first teeth (10) and at least one of said second teeth (12); and a third co-molding step wherein the plastic material is injected into said cavities of the mold.

3. A method of producing a continuously-variable-ratio transmission belt (1) comprising a beltlike continuity element (2) having a body (5) of elastomeric material and a number of threadlike longitudinal inserts (8); and a number of friction blocks (3) made of plastic material, fixed to said continuity element (2), and each defined by two lateral surfaces (4) converging inwards of said belt (1); said continuity element (2) comprising inner teeth (6) defined by a number of first teeth (10) alternating with respective cavities (11), and outer teeth (7) defined by a number of second teeth (12) alternating with respective cavities (13); and said method comprising a first step of forming said continuity element (2); a second step of placing said continuity element (2) inside a mold having a number of separate cavities of the same shape as the friction blocks (3) of the belt (1) and equal in number to the number of said blocks (3) so that each cavity of the mold houses at least one of said first teeth (10) and at least one of said second teeth (12); and a third molding step wherein the plastic material is injected into said cavities of the mold.

* * * * *